(12) United States Patent
Wasserman et al.

(10) Patent No.: US 8,273,678 B2
(45) Date of Patent: Sep. 25, 2012

(54) HIGHLY ACTIVE CATALYSTS FOR ALKYLENE OXIDE POLYMERIZATION

(75) Inventors: Eric P. Wasserman, Hopewell, NJ (US); Yang Cheng, Midland, MI (US); Lihao Tang, Edison, NJ (US)

(73) Assignee: Dow Global Technologies LLC, Midland, MI (US)

( * ) Notice: Subject to any disclaimer, the term of this patent is extended or adjusted under 35 U.S.C. 154(b) by 185 days.

(21) Appl. No.: 12/597,623

(22) PCT Filed: Feb. 28, 2008

(86) PCT No.: PCT/US2008/055281
§ 371 (c)(1),
(2), (4) Date: Apr. 12, 2010

(87) PCT Pub. No.: WO2008/134118
PCT Pub. Date: Nov. 6, 2008

(65) Prior Publication Data
US 2010/0197873 A1    Aug. 5, 2010

Related U.S. Application Data

(60) Provisional application No. 60/926,269, filed on Apr. 26, 2007.

(51) Int. Cl.
*B01J 31/00* (2006.01)
(52) U.S. Cl. ........ 502/172; 502/162; 502/167; 502/168; 526/189; 528/422
(58) Field of Classification Search ................... 528/422
See application file for complete search history.

(56) References Cited

U.S. PATENT DOCUMENTS

| | | | |
|---|---|---|---|
| 3,186,958 | A | 6/1965 | Kutner et al. |
| 3,419,505 | A | 12/1968 | Marsico |
| 3,607,785 | A | 9/1971 | Osgan et al. |
| 6,281,154 | B1 | 8/2001 | Bertrand et al. |
| 2004/0142814 | A1 | 7/2004 | Annis et al. |
| 2006/0247124 | A1 | 11/2006 | Partridge et al. |

FOREIGN PATENT DOCUMENTS

| | | |
|---|---|---|
| GB | 875161 | 12/1958 |
| GB | 1032033 | 5/1963 |

OTHER PUBLICATIONS

Akatsuka; "High-Speed 'Immortal' Polymerization of Epoxides Initiated with Aluminum Porphyrin. Acceleration of Propagation and Chain-Transfer Reactions by a Lewis Acid"; Macromolecules; 1994; pp. 2820-2825; vol. 27; Advance ACS Abstracts; American Chemical Society.
Bi; "Unusual Polymerization Activities of Bulky Aluminum Alkyl Complexes"; Journal of Molecular Catalysis A: Chemical; 2002; pp. 53-57; vol. 179; Elsevier Science B.V.
Braune; "An Efficient Method for Controlled Propylene Oxide Polymerization: The Significance of Bimetallic Activation in Aluminum Lewis Acids"; Angewandte Chemie International Edition; 2003; pp. 64-68; vol. 42; No. 1; Wiley-VCH Verlag GmbH & Co. KGaA; Weinheim.
Chen; "Aluminum Complexes Supported by Tridentate Aminophenoxide Ligand as Efficient Catalysts for Ring Opening Polymerization of e-Caprolactone"; Macromolecules; 2004; pp. 7968-7973; vol. 31; American Chemical Society.
Chisholm; "A Comparative Study in the Ring-Opening Polymerization of Lactides and Propylene Oxide"; Macromolecules; 2001; pp. 8851-8857; vol. 34; American Chemical Society.
Cottone; "Simultaneous Coordination of a Nucleophile with a Bifunctional Lewis Acid Assembly Incorporating a Linked Phenoxide Ligand System"; Organometallics; 2000; pp. 5254-5256; vol. 19; American Chemical Society.
Cottone et al.; "Dimetallic Lewis Acid Catalysts Prepared with Aryloxide Ligands"; 219th ACS National Meeting, Book of Abstracts; Mar. 26-30, 2000; American Chemical Society; Washington D.C.

(Continued)

*Primary Examiner* — Shane Fang

(57) ABSTRACT

The reaction product of the reaction product of A.) a ligand of the formula (I), wherein $R^1$, $R^2$, $R^3$, and $R^4$ in each occurrence independently are the same or different hydrocarbyl substituents of 1 to 20 carbon atoms, hydrogen, halogen, or alkoxy groups of 1 to 8 carbon atoms; X in each occurrence independently is $CR^6$ with $R^6$ being hydrogen or an alkyl group of 1 to 8 carbon atoms; and $R^5$ is an organic divalent group of 4 to 40 carbon atoms with the proviso that the two nodes X are not bound to the same atom or to vicinal atoms in the group $R^5$; B.) an aluminum compound of the formula $AlR^7R^8R^9$, wherein $R^7$, $R^8$ and $R^9$ each independently is a $C_1$ to $C_{12}$ hydrocarbyl group, hydrogen, halogen, or an alkoxy group of 1 to 20 carbon atoms; and C.) a Lewis base selected from the group consisting of amines, phosphines, amides, nitriles, isonitriles, and alcohols is useful as a polymerization catalyst, particularly for the homopolymerization or copolymerization of an alkylene oxide.

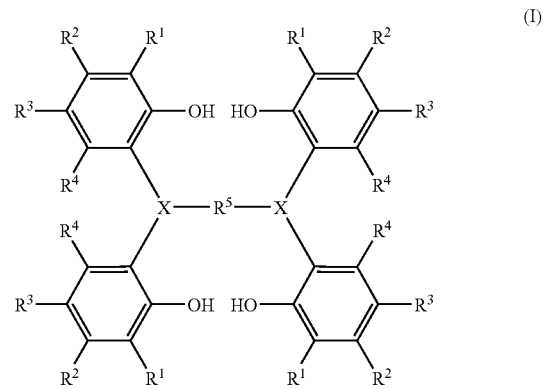

14 Claims, No Drawings

OTHER PUBLICATIONS

Cottone et al.; "Development and Application of a Novel Dinuclear Catalytic System"; 218th ACS National Meeting, Book of Abstracts; Aug. 22-26, 1999; American Chemical Society; Washington D.C.

Cottone et al.; "Study of Bulky-Aryloxide Dinuclear Lewis Acid Catalysts"; 220th ACS National Meeting, Book of Abstracts; Aug. 20-24, 2000; American Chemical Society; Washington D.C.

Dinger et al.; "Synthesis, Characterization, and Reactivity of Multinuclear Zinc(II) Derivatives of Linked Phenoxides"; 219th ACS National Meeting, Book of Abstracts; Mar. 26-30, 2000; American Chemical Society; Washington D.C.

Konsler; "Cooperative Asymmetric Catalysts with Dimeric Salen Complexes"; Journal of American Chemical Society; 1998; pp. 10780-10781; vol. 120; American Chemical Society.

Kuran; Epoxide Polymerization and Copolymerization with Carbon Dioxide Using Diethylaluminum Chloride-25,27-Calix[4]Arene System as a New Homogeneous Catalyst; Pure and Applied Chemistry; 1998; pp. 427-437; vol. 35; No. 3.

Ma; "Rare Earth Metal Complexes Supported by 1-Dithiaalkanediyl-Bridged Bis(Phenolato) Ligands: Synthesis, Characterization and Ring-Opening Polymerization Catalysis of L-Lactide"; Dalton Transactions; 2003; pp. 4770-4780; The Royal Society of Chemistry.

Miyamoto; Novel Isomerization Polymerization of Glycidyl Acetate to Produce a Poly(Ortho Ester); Macromolecules; 1997; pp. 6067-6073; vol. 30; American Chemical Society.

Ooi; "(2,7-Disubstituted-1,8-Biphenylenedioxy)Bis(Dimethylaluminum) as Bidentate Organoaluminum Lewis Acids: Elucidation and Synthetic Utility of the Double Electrophilic Activation Phenomenon"; JACS Articles; 2004; pp. 1150-1160; vol. 126; Journal of American Chemical Society.

Ooi; "Highly Efficient, Catalytic Meerwein-Ponndorf-Verley Reduction with a Novel Bidentate Aluminum Catalyst"; Angewandte Chemie International Edition; 1998; pp. 2347-2349; vol. 37; No. 17; Wiley-VCH Verlag GmbH; Weinheim.

Sarbu et al.; "Copolymers and Block-Copolymers of Cyclic Ethers and Carbon Dioxide"; Polymer Preprints; 2000, pp. 137-138; vol. 41; No. 1.

Scott et al.; "Multimetallic Aluminum Catalysts with Linked Aryloxide Ligands"; 219th ACS National Meeting, Book of Abstracts; Mar. 26-30, 2000; American Chemical Society; Washington D.C.

Schon; "Gas-Phase and Solution-Phase Polymerization of Epoxides by Cr(salen) Complexes: Evidence for a Dinuclear Cationic Mechanism"; Inorganic Chemistry' 2004;pp. 7278-7280; vol. 43; No. 23; American Chemical Society.

Sugimoto; Lewis Acid-Assisted Anionic Ring-Opening Polymerization of Epoxide by the Aluminum Complexes of Porphyrin, Phthalocyanine, Tetraazaannulene, and Schiff Base as Initiators; Macromolecules; 1994; pp. 2013-2018; vol. 27; American Chemical Society.

Takeuchi; Controlled Coordinate Anionic Polymerization of Oxetane by Novel Initiating Systems: Onium Salts/Bulky Organoaluminum Diphenolates; Macromolecules; 1996; pp. 8096-8100; vol. 29; American Chemical Society.

Thakur; "A New Dinuclear Chiral Salen Complexes for Asymmetric Ring Opening and Closing Reactions: Synthesis of Valuable Chiral Intermediates"; Journal of Organometallic Chemistry; 2006; pp. 1862-1872; vol. 691; Elsevier B.V.

Yang; Chemical Synthesis of Biodegradable Aliphatic Polyesters and Polycarbonates Catalyzed by Novel Versatile Aluminum Metal Complexes Bearing Salen Ligands; Alphatic Polyesters and Polycarbonates; pp. 373-384; 2004; Wiley InterScience.

HIGHLY ACTIVE CATALYSTS FOR ALKYLENE OXIDE POLYMERIZATION

CROSS REFERENCE TO RELATED APPLICATIONS

This application is a 35 USC §371 national phase filing of PCT/US2008/055281 filed 28 Feb. 2008, which claims the benefit of U.S. Application No. 60/926,269, filed 26 Apr. 2007.

The present invention relates to the reaction product of a polyphenol ligand with an aluminum compound and to a polymerization catalyst comprising such reaction product and a Lewis base compound.

BACKGROUND OF THE INVENTION

High molecular weight homo- or copolymers of ethylene oxide with a weight average molecular weight (MW) of 80,000 or more are water-soluble polymers which are often used to thicken aqueous solutions or to control diffusion, e.g., as a drug excipient. Lower molecular weight homo- or copolymers of propylene oxide or butylene oxide with a MW of 500 to 20,000 are typically used in polyurethane production, while polymers with a MW of 20,000-80,000 may be useful either in themselves or as intermediates in personal care or polymeric electrolyte applications. Ethylene oxide homo- or copolymers are generally made by heterogeneous catalysts which produce polymer with MW in the range of 2,000,000 to 20,000,000. Current processes for the production of polymer MW between 80,000 and 2,000,000 employ high-energy radiation to initiate radical chain scission in the polymer after it has left the reactor. This process is complex and costly, and may cause the polymer to become unstable and continue to lose molecular weight over time. What is needed is a new catalyst system which produces alkylene oxide homo- or copolymers, such as poly(ethylene oxide) (PEO) with a MW of 5,000 to 2,000,000 g/mol directly in the polymerization reactor.

The products of the reaction of hindered phenol ligands with aluminum compounds are known to catalyze the polymerization of alkylene oxides. The prior technologies are significantly deficient in either the range of polymer molecular weights or catalyst activity.

British Patent Specification GB 875161, to Petrochemicals Ltd., teaches the use of aluminum triphenoxide as a single-component catalyst for the polymerization of ethylene oxide. Catalyst activity is very poor.

Braune and Okuda (Angew. Chem. Int. Ed. 2003, 42, 64-68) describe how biphenolatoaluminum complexes, when combined with an anionic additive in substoichiometric quantities, are active catalysts for propylene oxide polymerization. Polymers with weight average molecular weights of less than 5,000 g/mol are obtained.

The published patent WO2002098559 A2, to Union Carbide, deals with the use of phenoxyaluminum complexes for the polymerization of ethylene oxide. Unfortunately, the catalyst activities disclosed in the Examples are not very high (<20 g(polymer)/mmol(Al)).

Chisholm and co-workers (Macromolecules 2001, 34, 8851-8857) discuss the uses of phenoxyaluminum complexes for the polymerization of propylene oxide. The catalysts are relatively inactive, having productivities of less than 5 g(polymer)/mmol(Al).

A paper by Kuran et al. (J. of Macromol. Sci., Pure Appl. Chem. 1998, A35, 427-437) describes the use of calixarene complexes of aluminum as catalysts for oxirane polymerization. Calixarenes are cyclic oligophenoxides. Reported polymer molecular weights are below 5,000 g/mol and total catalyst turnovers are less than 50.

A paper from Inoue and co-workers (Macromolecules 1994, 27, 2013-18) shows the use of Schiff-base aluminum complexes as catalysts for oxirane polymerization. Schiff bases contain phenol groups. Catalyst productivities and polymer molecular weights are fairly low (below 15 g(polymer)/mmol(Al) and below 30,000, respectively).

In a paper from Chisholm and co-workers (Inorg. Chem. 2004, 43, 7278-7280) the authors demonstrate the oligomerization of propylene oxide using a dinuclear chromium complex containing two Schiff-base coordination sites.

U.S. Pat. No. 3,186,958 to Hercules Powder Co. Ltd, teaches the use of combinations of trialkylaluminum compounds with substoichiometric levels of Lewis bases as catalysts for ethylene oxide polymerization. Reported catalyst productivities are below 10 g(polymer)/mmol(Al).

An article by Akatsuka et al. (Macromolecules 1994, 27, 2820-2825) describes the use of phenoxyaluminum complexes as cocatalysts for the polymerization of propylene oxide catalyzed by porphinatoaluminum complexes. The phenoxyaluminum species is not shown to be active by itself.

Ligands such as the ones described in the present patent application are disclosed by Cottone and Scott (Organometallics 2000, 19, 5254-5256). In this paper ligands are shown which bind two aluminum atoms which can coordinate a chloride ion between them. No catalysis is reported using the complexes. In oral presentations in the years 1999 and 2000, members of this research group reported that complexes of tetraphenols possessing two aluminum atoms are active for the catalysis of monomeric molecular reactions involving carbonyl group transformations (see: Cottone, A.; Scott, M. J. Book of Abstracts, 218th ACS National Meeting, New Orleans, Aug. 22-26, 1999, INOR-192; Cottone, A., III; Scott, M. J. Book of Abstracts, 219th ACS National Meeting, San Francisco, Calif., Mar. 26-30, 2000, INOR-208; Scott, M. J.; Cottone, A., III; Lecuivre, J. L. Book of Abstracts, 219th ACS National Meeting, San Francisco, Calif., Mar. 26-30, 2000, INOR-421; Cottone, A., III; Scott, M. J. Abstracts of Papers, 220th ACS National Meeting, Washington, D.C., United States, Aug. 20-24, 2000, INOR-031).

U.S. Pat. No. 3,607,785 A to Institut Francais du Petrole des Carburants et Lubrifiants, teaches the polymerization of alkylene oxides using bimetallic catalysts. The bimetallic catalyst is produced by reacting a trivalent metal compound $(R_1O)_2M'$-OX with a compound of a divalent metal Y—O-M-Z, wherein M' is aluminum, M is zinc, Z is a hydrocarbyl acyloxy radical, X is $R_4$, Y is a hydrocarbon, and $R_1$ to $R_4$ are hydrocarbon monovalent radicals.

References to the acceleration of organic reactions due to the binding of one ligand with more than one metal exist, but none deal with the polymerization of oxiranes. These include the work of Ooi and co-workers (J. Am. Chem. Soc. 2004, 126, 1150-1160). The following reference discloses the use of bis-Schiff base ligands which bind two aluminum atoms as catalysts for cyclic lactone and carbonate polymerization: Yang et al., J. Polym. Sci. A.: Polym. Chem. 2005, 43, 373-384.

In view of the low activities of the catalysts which are known for ethylene oxide polymerization, there is a need for high-activity catalysts for the homo- or polymerization of alkylene oxides.

SUMMARY OF THE INVENTION

One aspect of the present invention is a polymerization catalyst which comprises the reaction product of
A.) a ligand of the formula I,

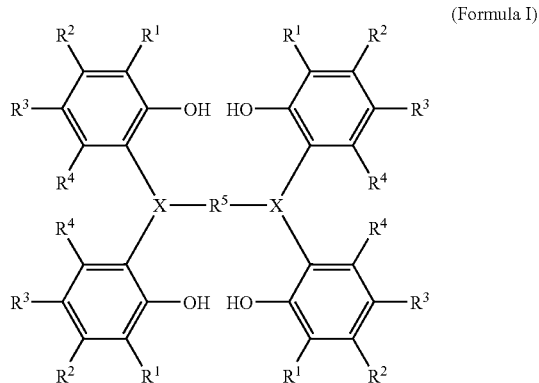

(Formula I)

wherein
$R^1$, $R^2$, $R^3$, and $R^4$ in each occurrence independently are the same or different hydrocarbyl substituents of 1 to 20 carbon atoms, hydrogen, halogen, or alkoxy groups of 1 to 8 carbon atoms;
X in each occurrence independently is $CR^6$ with $R^6$ being hydrogen or an alkyl group of 1 to 8 carbon atoms; and
$R^5$ is an organic divalent group of 4 to 40 carbon atoms with the proviso that the two nodes or groups X are not bound to the same atom or to vicinal atoms in the group $R^5$; and
B.) an aluminum compound of the formula $AlR^7R^8R^9$, wherein $R^7$, $R^8$ and $R^9$ each independently is a $C_1$ to $C_{12}$ hydrocarbyl group, hydrogen, halogen, or an alkoxy group of 1 to 20 carbon atoms; and
C.) a Lewis base selected from the group consisting of amines, phosphines, amides, nitriles, isonitriles, and alcohols.

Another object of the present invention is a process for homopolymerizing or copolymerizing an alkylene oxide which comprises the step of contacting one or more alkylene oxides with a catalytic amount of a reaction product of at least A.) an above-described ligand of the formula I and B.) an above-described aluminum compound.

Yet another aspect of the present invention is the use of the above-described polymerization catalyst in the homo- or copolymerization of an alkylene oxide.

DETAILED DESCRIPTION OF THE INVENTION

The inventors of the present patent application have found that certain aluminum complexes act as catalysts in the homo- or copolymerization of alkylene oxides. The ligand is composed of two moieties, each bearing two phenol groups so arranged to chelate to a single aluminum atom, bound to each other through a divalent group having a structure such that it prevents the two aluminum atoms from being too close together. These aluminum complexes, which are the reaction product of a ligand (A) described below and an aluminum compound (B) described below are particularly effective as polymerization catalysts if they are combined with a Lewis base C) described below.

In the ligands (A) of Formula I above $R^1$ preferably in each occurrence independently is a hydrocarbyl substituent of 4 to 10 carbon atoms or hydrogen. More preferably $R^1$ in each occurrence independently is t-butyl, 1,1,3,3-tetramethylbutyl, 1-methylcyclohexyl, 1-adamantyl, or α,α-dimethylbenzyl. Preferably $R^3$ in each occurrence independently is a hydrocarbyl substituent of 1 to 10 carbon atoms or hydrogen. Preferably $R^2$ and $R^4$ in each occurrence independently are hydrogen or methyl, more preferably hydrogen. X in each occurrence independently is $CR^6$ with $R^6$ preferably being hydrogen or methyl.

$R^5$ is an organic divalent group of 4 to 40 carbon atoms with the proviso that the two nodes X are not bound to the same atom or to vicinal atoms in the group $R^5$. The chemical structure in the term "the two nodes X are not bound to the same atom or to vicinal atoms in the group $R^5$" can be expressed in different words by stating that $R^5$ is such that the shortest path which can be traced between the two groups X, travelling from one atom to another to which it is covalently bound, passes through at least three intervening atoms. The divalent group $R^5$ preferably is aromatic. More preferably, the divalent group $R^5$ comprises a heteroatom selected from the group consisting of O, N, S, Se and P. Most preferably, the divalent group $R^5$ is aromatic and comprises a heteroatom selected from the group consisting of O, N, S, Se and P.

Most preferably the compound represented by the formula I has the preferred meanings for $R^1$, $R^2$, $R^3$, $R^4$, $R^5$ and $R^6$ in combination. Although the four substituents $R^1$ can have different meanings, preferably all substituents $R^1$ have the same meaning. The same applies analogously to the four substituents $R^2$, $R^3$ and $R^4$ and to the two substituents $R^6$.

In a preferred embodiment of the present invention, the ligand (A) of the organoaluminum reaction product is a tetraphenol compound represented by the formula II

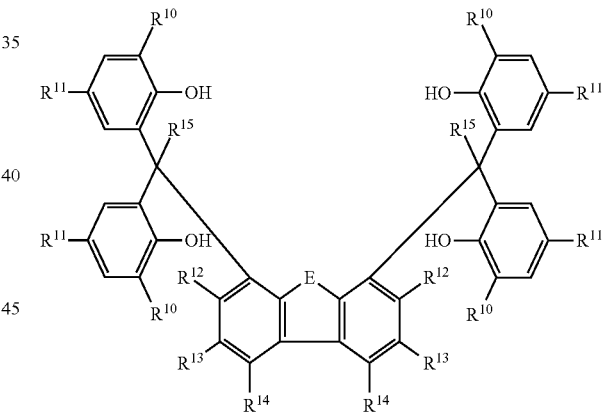

wherein
$R^{10}$, $R^{11}$, $R^{12}$, $R^{13}$, and $R^{14}$ in each occurrence independently are the same or different hydrocarbyl substituents of 1 to 20 carbon atoms or hydrogen, $R^{15}$ in each occurrence independently is an alkyl group of 1 to 8 carbon atoms or hydrogen, and E is selected from the group consisting of O, S, $NR^{16}$, $PR^{16}$ and $C(R^{16})_2$, in which $R_{16}$ in each occurrence independently is a hydrocarbyl group of 1 to 8 carbon atoms or hydrogen.

In this embodiment it is preferred that $R^{10}$ in each occurrence independently is a hydrocarbyl substituent of 4 to 10 carbon atoms or hydrogen. More preferably $R^{10}$ in each occurrence independently is t-butyl, 1,1,3,3-tetramethylbutyl, 1-methylcyclohexyl, 1-adamantyl, or α,α-dimethylbenzyl. Preferably $R^{11}$ in each occurrence independently is a hydrocarbyl substituent of 1 to 10 carbon atoms or hydrogen. Preferably $R^{12}$, $R^{13}$, and $R^{14}$ each are hydrogen. $R^{15}$ preferably is hydrogen or methyl. Preferably E is oxygen or sulfur, more preferably sulfur. Most preferably the compound represented by the formula II has the preferred meanings for $R^{10}$, $R^{11}$, $R^{12}$, $R^{13}$, and $R^{14}$ and $R^{15}$ in combination. Although the four substituents $R^{10}$ can have different meanings, preferably all substituents $R^{10}$ have the same meaning. The same applies analogously to the four substituents $R^{11}$, the two substituents $R^{12}$, $R^{13}$, $R^{14}$ and $R^{15}$ and to the substituents $R^{16}$ if there are two. Most preferably $R^{10}$ and $R^{11}$ have the above-mentioned meanings, $R^{12}$, $R^{13}$, $R^{14}$, and $R^{15}$ are hydrogen and E is sulfur.

In another preferred embodiment of the present invention the ligand (A) of the organoaluminum reaction product is an organic compound represented by the formula III

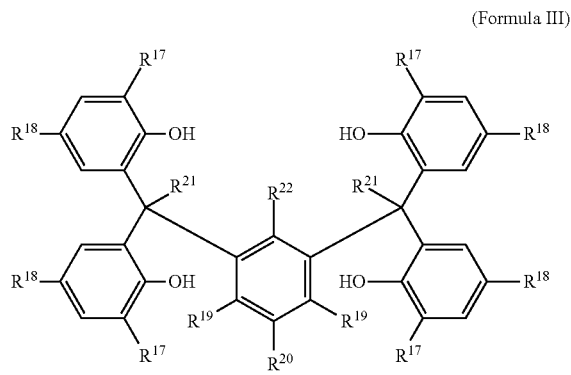

(Formula III)

wherein $R^{17}$, $R^{18}$ and $R^{19}$ in each occurrence independently are the same or different hydrocarbyl substituents of 1 to 20 carbon atoms or hydrogen, $R^{20}$ is a hydrocarbyl substituent of 1 to 20 carbon atoms, hydrogen or an alkoxy group of 1 to 20 carbon atoms, $R^{21}$ in each occurrence independently is an alkyl group of 1 to 8 carbon atoms or hydrogen, and $R^{22}$ (is hydrogen or a group $OR^{23}$, $SR^{23}$, $N(R^{23})_2$, or $P(R^{23})_2$, wherein $R^{23}$ in each occurrence independently is hydrogen or a hydrocarbyl group of 1 to 8 carbon atoms.

In this embodiment it is preferred that $R^{17}$ in each occurrence independently is a hydrocarbyl substituent of 4 to 10 carbon atoms or hydrogen. More preferably $R^{17}$ in each occurrence independently is t-butyl, 1,1,3,3-tetramethylbutyl, 1-methylcyclohexyl, 1-adamantyl, or α,α-dimethylbenzyl. Preferably $R^{18}$ in each occurrence independently is a hydrocarbyl substituent of 1 to 10 carbon atoms or hydrogen. $R^{19}$ preferably in each occurrence is hydrogen. $R^{20}$ preferably is hydrogen, alkyl of 1 to 4 carbon atoms, more preferably methyl or t-butyl, or alkoxy of 1 to 4 carbon atoms, more preferably methoxy. $R^{21}$ and $R^{23}$ preferably in each occurrence independently are the same or different and are hydrogen or methyl. $R^{22}$ preferably is a hydroxyl or methoxy group. Most preferably the compound represented by the formula III has the preferred meanings for $R^{17}$, $R^{18}$, $R^{19}$, $R^{20}$, $R^{21}$, $R^{22}$ and $R^{23}$ in combination. Although the four substituents $R^{17}$ can have different meanings, preferably all substituents $R^{17}$ have the same meaning. The same applies analogously to the four substituents $R^{18}$, the two substituents $R^{19}$, and optionally the two substituents $R^{23}$.

The following compounds are illustrative but non-limiting examples of useful ligands:
2,2',2'',2'''-(4,6-dibenzofurandiyldimethylidyne)tetrakis[4-(1,1-dimethylethyl)-6-methylphenol];
2,2',2'',2'''-(4,6-dibenzothiophenediyldimethylidyne)tetrakis[4-(1,1-dimethylethyl)-6-methylphenol];
2,2',2'',2'''-(4,6-dibenzofurandiyldimethylidyne)tetrakis[4,6-bis(1,1-dimethylethyl)phenol;
2,2',2'',2'''-(4,6-dibenzothiophenediyldimethylidyne)tetrakis[4,6-bis(1,1-dimethylethyl)phenol];
2,2',2'',2'''-(4,6-dibenzothiophenediyldimethylidyne)tetrakis[6-t-butyl-4-ethylphenol];
2,2',2'',2'''-(4,6-dibenzothiophenediyldimethylidyne)tetrakis[6-n-dodecyl-4-methylphenol];
2,2',2'',2'''-(4,6-dibenzothiophenediyldimethylidyne)tetrakis[4-methyl-6-(1,1,3,3-tetramethylbutyl)phenol];
2,2',2'',2'''-(4,6-dibenzothiophenediyldimethylidyne)tetrakis[4-methyl-6-(1-methylcyclohexyl)-phenol];
2,2',2'',2'''-(4,6-dibenzothiophenediyldimethylidyne)tetrakis[6-(1-adamantyl)-4-methylphenol];
2,2',2'',2'''-(4,6-dibenzothiophenediyldimethylidyne)tetrakis[4,6-bis(α,α-dimethylbenzyl)phenol];
α,α,α',α'-tetrakis(3,5-di-t-butyl-2-hydroxyphenyl)-m-xylene;
α,α,α', α'-tetrakis(3-t-butyl-2-hydroxy-5-methylphenyl)-m-xylene;
2,6-bis[bis(3,5-di-t-butyl-2-hydroxyphenyl)methyl]-4-t-butylphenol;
2,6-bis[bis(3,5-di-t-butyl-2-hydroxyphenyl)methyl]-4-t-butylanisole;
2,6-bis[bis(3,5-di-t-butyl-2-hydroxyphenyl)methyl]anisole;
bis((bis(3,5-di-t-butyl-2-hydroxyphenyl)methyl)phenyl) ether;
2,2',2'',2'''-[(9,9-dimethyl-9H-xanthene-4,5-diyl)dimethylidyne]tetrakis[4,6-bis(1,1-dimethylethyl)phenol]; and
2,2',2'',2'''-[(9,9-dimethyl-9H-xanthene-4,5-diyl)dimethylidyne]tetrakis[6-t-butyl-4-methylphenol].

Compound (B) is an aluminum compound of the formula $AlR^7R^8R^9$, wherein $R^7$, $R^8$ and $R^9$ each independently is a hydrocarbyl group of 1 to 12, preferably 1 to 8 carbon atoms, hydrogen, halogen, or an alkoxy group of 1 to 20, preferably 1 to 12, more preferably 1 to 8 carbon atoms.

The following compounds are illustrative but non-limiting examples of useful aluminum compounds (B): trimethylaluminum; triethylaluminum; triisobutylaluminum; tri-n-hexylaluminum; tri-n-octylaluminum; triisoprenylaluminum; tribenzylaluminum; diethylaluminum hydride; diisobutylaluminum hydride; tris(2-cyclohexylethyl)aluminum; diethylaluminum ethoxide; dimethylaluminum isopropoxide; diethylaluminum isopropoxide; diethylaluminum chloride; dimethylaluminum chloride; diisobutylaluminum chloride; or aluminum triisopropoxide.

Preferably, the aluminum compound is triisobutylaluminum, diethylaluminum chloride, dimethylaluminum isopropoxide, or diethylaluminum isopropoxide.

The molar ratio of the aluminum atoms from the aluminum compound (B) to the OH groups from the ligand (A) is preferably from about 0.1:1 to about 10:1, more preferably from about 0.25:1 to about 1:1, and most preferably from about 0.4:1 to about 0.75:1.

The following compounds are illustrative but non-limiting examples of useful Lewis base compounds (C): trimethylamine; triethylamine; diethylamine; di-n-butylamine; N,N-dimethylaniline; tri-n-butylamine; diisopropylethylamine; quinoline; pyridine; 1,8-diazabicyclo[5.4.0]undec-7-ene; triphenylphosphine; t-butanol; thiophenol; or thioanisole.

Preferably, the Lewis base compound is triethylamine, pyridine, triphenylphosphine, or 1,8-diazabicyclo[5.4.0]undec-7-ene.

The molar ratio of the aluminum atoms from the aluminum compound (B) to the Lewis base compound (C) is preferably from about 20:1 to about 1:1, more preferably from about 5:1 to about 1.25:1, and most preferably from about 2.5:1 to about 1.75:1.

The molar ratio of the ligand (A) to the Lewis base compound (C) is preferably from about 100:1 to about 1:2, more preferably from about 10:1 to about 1:1 and most preferably from about 2:1 to about 1:2.

The reaction product of the present invention is produced by contacting the chelating ligand (A) with the aluminum compound (B), and the Lewis base compound (C). The combination of (A) with (B) and (C) can be done in any order. The mixing time is generally between 5 minutes and 24 hours. Preferably, the reaction is conducted under an inert atmosphere, such as dry, deoxygenated nitrogen or argon, in the presence of an aprotic organic reaction diluent, such as a hydrocarbon or an ether, preferably diethyl ether. Saturated aliphatic, saturated cycloaliphatic or aromatic hydrocarbons are particularly useful, such as butanes, pentanes, hexanes, heptanes, decanes, cyclopentane, cyclohexane, methylcyclohexane, benzene, toluene, xylene or ethylbenzene. The temperature of reaction is preferably kept between −30 and 100° C., more preferably between 10 and 70° C. A halogenated hydrocarbon with limited reactivity to aluminum alkyl compounds, such as chlorobenzene, can also be used if desired. The weight ratio between the aluminum compound (B) and the organic reaction diluent generally is from 0.01:1 to 4:1, preferably from 0.1:1 to 1:1. Preferably the concentrations of the reagents in the reaction diluent and their addition rate are kept low enough so that heating in excess of 100° C. is avoided. Advantageously, the produced reaction product is stored and handled in an inert gas atmosphere.

The product of the reaction of the two compounds (A) and (B) is optionally isolated. For example, it may be isolated by removal of reaction diluent under reduced pressure, or by recrystallization. The reaction product may also be an oil at 25° C. The reaction product is generally highly reactive towards water and oxygen, and may be pyrophoric. If the reaction product is not isolated, it is generally stable while it is dissolved in the reaction diluent used for carrying out the reaction of (A) and (B) and can be used in such form. If it is used as a polymerization catalyst, it can for example be added to the polymerization vessel while it is dissolved in the above-mentioned reaction diluent. The combination of (A) and (B) is active for the polymerization of alkylene oxides, but it is preferred to add the Lewis base (C) as this imparts higher activity.

It has been found that the reaction product of the ligand (A), the aluminum compound (B), and optionally the Lewis base (C) is useful as a catalyst for the homo- and copolymerization of alkylene oxides. It has been found that the homo- and copolymerization of alkylene oxides to high molecular weight polymers can be carried out efficiently. Productivities in excess of 20 g(polymer)/mmol(Al) are generally obtained. The catalyst of the invention generally allows for molecular weight control, has reduced pyrophoricity, is compatible with a variety of functional groups, and produces odorless products.

While not wishing to be bound by any theory, it is believed that the function of ligand (A) is to bring two aluminum atoms together in an appropriate geometry for the polymer chain bound to one aluminum atom to react with an alkylene oxide molecule bound to another aluminum atom. It is believed that, in solution, the equilibrium structure of the reaction product of one molar equivalent of tetraphenol ligand of formula I with 2 molar equivalents of aluminum compound (B) contains two trivalent aluminum atoms, each bound to one bisphenol fragment joined at node X. The bridging group $R^5$ will then predispose the structure to have the proper aluminum-aluminum distance for effective intramolecular nucleophilic attack of the growing polymer chain upon the activated monomer. It is also believed that the function of the Lewis base (C) is to initiate polymerization by performing the first ring-opening reaction.

The polymerization catalyst of the present invention comprises the above described organoaluminum reaction product of the ligand (A), the aluminum compound (B), and the Lewis base (C). This means that either the organoaluminum reaction product is the only component of the polymerization catalyst or other, optional components are also comprised in the polymerization catalyst. Additional, optional components are for example a carrier, such as silica, or a filler, such as fumed silica. Fillers such as finely divided silica, alumina, or titania may be added to the catalyst to reduce the tendency of polymer to agglomerate during handling. It is recommended that any inorganic solid placed in contact with the polymerization catalyst described herein or with any of its components be thoroughly dried prior to mixing, as residual water will generally hinder polymerization.

To produce a polymerization catalyst with improved handling properties, the organoaluminum reaction product can be immobilized by impregnation and drying with a particulate material, preferably a porous particulate material, such as silica, or by spray-drying a solution of the organoaluminum reaction product, optionally in the presence of a particulate material such as fumed silica. After the organoaluminum reaction product has been applied on a particulate material, the immobilized catalyst can either be added directly to a polymerization reactor or can be mixed with an inert fluid, such as mineral oil, and injected as a homogeneous slurry. The weight ratios between these components are preferably chosen that they meet the following relationships:

$$0.1 \leq (A+B+C+D)/(A+B+C) \leq 10 \text{ and}$$

$$1 \leq (A+B+C+D+E)/(A+B+C+D) \leq 30,$$

wherein A is the weight of the ligand (A), B is the weight of the aluminum compound (B), C is the weight of the Lewis base (C), D is the weight of the particulate material and E is the weight of the inert fluid.

The activity of the organoaluminum reaction product as polymerization catalyst, preferably as a catalyst for the homopolymerization or copolymerization of an alkylene oxide, can be enhanced by use of a scavenging agent, which removes traces of oxygen or moisture from the polymerization mixture. Scavenging agents with little or no activity towards the polymerization of alkylene oxides are preferred, as they will not broaden the molecular weight distribution of the product. Exemplary of useful scavenging agents are triethylaluminum, triethylborane, lithium aluminum hydride, n-butyllithium, and diethylzinc. If a scavenging agent is used, the molar ratio between the scavenging agent and the aluminum atoms in the catalyst generally is from 1:1000 to 1:1, preferably from 1:100 to 1:10.

A reaction mixture comprising at least one alkylene oxide is contacted with the above described catalyst to produce polymer. The catalyst is effective for the homo- or copolymerization of a variety of alkylene oxides. Simple alkylene oxides such as ethylene oxide and propylene oxide are preferred, but the term "alkylene oxide" as used herein also encompasses functionalized alkylene oxides, such as epihalohydrins, glycidyl amines, unsaturated glycidyl ethers, glycidyl acrylates, methacrylates, and glycidyl alkylsilanes. The catalyst may also be useful for the homopolymerization of cyclic alkylene oxides and aliphatic-substituted alkylene oxides which are usually hindered by steric and conformational factors.

A list of alkylene oxides that may be homopolymerized or copolymerized is disclosed in U.S. Pat. No. 3,135,705, column 1, line 41 to column 2, line 7. This list is incorporated herein by reference. Preferred alkylene oxides are ethylene oxide, propylene oxide, 1,2-cyclohexene epoxide, 1,2-butene epoxide, allyl glycidyl ether, glycidyl methacrylate, epichlorohydrin, 1,3-butadiene diepoxide, styrene oxide, 4-vinyl-1-cyclohexene 1,2-epoxide, 4-(2-trimethoxysilylethyl)-1,2-epoxycyclohexene and 4-vinyl-1-cyclohexene diepoxide. The most preferred alkylene oxide is ethylene oxide. Random copolymers may be produced from the polymerization of mixtures of at least two alkylene oxides. Block copolymers may be produced from the sequential addition of more than one alkylene oxide, in which nearly total consumption of each alkylene oxide takes place prior to the addition of subsequent monomer(s).

Other monomers may be copolymerized with alkylene oxides through the use of the catalyst of the invention. Preferred examples thereof are oxetane, methyl acrylate, ethyl acrylate, ε-caprolactone, ethylene carbonate, trimethylene carbonate, 1,3-dioxolane, carbon dioxide, carbonyl sulfide, tetrahydrofuran, methyl isocyanate, and methyl isocyanide. The most preferred alkylene oxide polymers are poly(ethylene oxide), poly(propylene oxide), and random copolymer of ethylene oxide and propylene oxide.

If an alkylene oxide copolymer is produced, the produced copolymer generally comprises at least 50 mole percent, preferably at least 70 mole percent, more preferably at least 85 mole percent alkylene oxide units.

The molar ratio between the alkylene oxide and the aluminum atoms from the catalyst generally is from 10:1 to 300,000:1, preferably from 200:1 to 200,000:1, more preferably from 300:1 to 100,000:1.

Polymerization of one or more alkylene oxides and optional other comonomers may be performed in the gas phase, solution phase, or in a slurry, generally at pressures from 0.1 to 1000 bar, preferably from 1 to 100 bar, more preferably from 1 to 15 bar. The polymerization temperature generally ranges from −40° C. to 200° C., although it is highly recommended that the reaction temperature be kept as low as economically practical to avoid spontaneous or runaway polymerization. Preferably, the polymerization is performed at a temperature of from 0° C. to 100° C., more preferably from 10° C. to 60° C.

Preferably, the polymerization is conducted in a hydrocarbon medium. Aromatic hydrocarbons are useful, such as benzene, toluene, xylene, or ethylbenzene. Preferably, the polymerization is conducted in an aliphatic hydrocarbon, preferably a saturated aliphatic or saturated cycloaliphatic hydrocarbon, such as a butane, a pentane, a hexane, a heptane, a decane, cyclopentane, cyclohexane, or methylcyclohexane. Alternatively, the polymerization can be conducted in an ether, such as diethyl ether. Strongly coordinating solvents such as tetrahydrofuran, ethyl acetate, or acetonitrile should generally be avoided.

The alkylene oxide as well as any solvent or inert gas should generally be thoroughly dried and deoxygenated prior to use. It is often advantageous to employ an above-mentioned scavenging agent in the reaction medium, which removes the last traces of adventitious water, which might reduce polymerization activity. Drying and scavenging agents are advantageously chosen to avoid undesired polymerization. Other methods for enhancing polymerization activity which are known to those skilled in the art may also be employed.

To control the molecular weight of the polymer, one may vary the ratio between monomer and catalyst, the number-average molecular weight rising with this ratio. Alternatively, one may use a chain-transfer agent to reduce the molecular weight. Examples of chain-transfer agents which may work in this regard are for example metal alkoxides such as aluminum triisopropoxide, tetra-n-butyl titanate, tetraethyl silicate, and zirconium tetra-n-butoxide; and organic carbonates, esters, and orthoesters such as ethyl formate, diethyl carbonate, triethyl orthoformate, and trimethyl orthoacetate. It is possible to lower the molecular weight through the addition of a protic reagent such as an alcohol, for example n-butanol, as long as the molar ratio between protic groups to aluminum atoms is kept below 50:1.

According to the polymerization process of the present invention an alkylene oxide homopolymer or copolymer is produced which generally has a weight average molecular weight of from 5,000 to $10^7$, more preferably from 10,000 to 5,000,000, most preferably from 20,000 to 2,000,000, particularly from 20,000 to 1,000,000. A narrow molecular weight distribution (Mw/Mn, also designated as polydispersity index) is typically achieved. Mw/Mn is generally from 1 to 8, preferably from 1 to 6, most preferably from 1 to 4. The resulting polymers are generally white. By using the catalyst of the present invention, alkylene oxide homopolymers and copolymers with the desired molecular weight can be achieved with efficiencies which are comparable to or greater than the known alkylene oxide catalysts.

The alkylene oxide homopolymers and copolymers can be recovered from the polymerization through known methods. These methods include precipitation of polymer through the addition of a poor solvent, followed by filtration and devolatilization, optionally at elevated temperature and reduced pressure. If catalyst residues are present in high concentration in the final composition, it may be useful to quench these residues through controlled hydrolysis to prevent the residues from adversely affecting polymer performance. It is often advantageous to add one or more additives to the polymer at some point in its recovery. Such additives may confer improved resistance to oxidative, photolytic, or thermal degradation, or may improve the appearance of the final product by preventing discoloration or by enhancing diffuse light reflectance, or may reduce the buildup of static electricity.

The present invention is further illustrated by the following examples which should not be construed to limit the scope of the present invention. All parts and percentages are by weight unless otherwise indicated.

EXAMPLES 1 TO 39 AND COMPARATIVE EXAMPLES C1 TO C12

Abbreviations

DEAC: diethylaluminum chloride
DMAiP: dimethylaluminum isopropoxide
EO: ethylene oxide
$M_n$: number-average molecular weight
$M_w$: weight-average molecular weight
P2102: 2,2'-methylenebis(4,6-di-t-butylphenol)
P2202: 2,2'-ethylidenebis(4,6-di-t-butylphenol)
P4102: 2,2',2'',2'''-(4,6-dibenzofurandiyldimethylidyne)tetrakis(4,6-di-t-butylphenol)

P4301: 2,2',2'',2'''-(4,6-dibenzothiophenediyldimethylidyne) tetrakis(6-t-butyl-4-methylphenol)
P4302: 2,2',2'',2'''-(4,6-dibenzothiophenediyldimethylidyne) tetrakis(4,6-di-t-butylphenol)
P4307: 2,2',2'',2'''-(4,6-dibenzothiophenediyldimethylidyne) tetrakis[4-methyl-6-(1,1,3,3-tetramethylbutyl)phenol]
P4308: 2,2',2'',2'''-(4,6-dibenzothiophenediyldimethylidyne) tetrakis[4-methyl-6-(1-methylcyclohexyl)-phenol]
P4310: 2,2',2'',2'''-(4,6-dibenzothiophenediyldimethylidyne) tetrakis[4,6-bis($\alpha,\alpha$-dimethylbenzyl)phenol]
P4642: 2,2',2'',2'''-(2-Methoxybenzene-1,3-diyldimethylidyne)tetrakis(4,6-di-t-butylphenol)
P5102: 2,6-bis(3,5-di-t-butyl-2-hydroxyphenyl)methyl-4-t-butylphenol
TiBA: triisobutylaluminum
TEA: triethylamine Materials. P2202 (99%), TiBA, DEAC, and TEA were purchased from Sigma Aldrich and used without further purification. TiBA was obtained as a 1 mol/L solution in hexanes. DEAC was obtained as a 1 mol/L solution in heptane. DMAiP was purchased from Strem Chemical. Ethylene oxide, 100%, (EO) was produced by ARC Specialty Products and obtained from Airgas, Inc. P2102 was prepared according to the procedure of Canadian Patent 1,062,282, to Nauchno-Issledovatelsky Institut Rezinovykh i Latexnykh Izdely and Sterlitamaxky Opytno-Promyshlenny Zavod po Proizvodstvu Izoprenovogo Kauchuka, filed Dec. 22, 1975. P4102 was prepared according to the procedure of Cottone, A., III; Scott, M. J. Organometallics 2002, 21, 3610-3627. 2-(1-Methylcyclohexyl)-4-methylphenol was prepared according to a literature procedure ((a) U.S. Pat. No. 2,732,407, 1956, inventors Lambert, A.; Williams, G. E., to Imperial Chemical Industries Limited; (b) U.S. Pat. No. 2,762,787, 1956, inventors Goodman, I.; Lambert, A.; Smith, J. F.; Williams, G. E., to Imperial Chemical Industries Limited). Solutions for the polymerization examples were made up by the dissolution of solids or further dilution of commercial solutions in anhydrous hexanes or toluene. All handling of materials including the polymerization was done under dry nitrogen.

Molecular Weight Analysis by Gel Permeation Chromatography (GPC). Sample preparation: polymer (ca. 10 mg) was mixed with 20 mL dimethylformamide (DMF), agitated at 70° C. using heated shaker for ca. 15 min, then allowed to cool to room temperature while shaking. Solutions were passed through a 0.45 µm PTFE syringe filter and analyzed on column. Column conditions: 2 plgel mixed-B columns, run at 50° C., with an injection volume of 100 µL; RI detection (50° C.); DMF containing 4 g/L LiNO$_3$ used as eluent. Column calibration: 14 PEO narrow MWD standards ranging from 771,000-960 g/mol; calibration curve fit with a third order polynomial. GPC analysis was not performed on samples made in runs producing less than 50 mg polymer because of the relatively high level of catalyst residue.

Example 1

Synthesis of P4302

A mixture of 0.6 g (2.5 mmol) of 4,6-dibenzothiophenedicarbaldehyde (prepared according to the procedure of Skar, M. L.; Svendsen, J. S. Tetrahedron 1997, 53, 17425-17440) and 10.3 g (50 mmol) of 2,4-di-t-butylphenol was heated at 96° C. under nitrogen. After stirring for 1 hr, 0.8 mL of 12N HCl solution was added and the mixture was stirred for 12 hr. The brown homogeneous solution was allowed to cool to room temperature. 20 mL of CH$_3$CN and 5 mL of water was added, and the mixture was stirred at room temperature overnight. The product was collected, recrystallized from CH$_3$CN/water (4:1), washed with CH$_3$CN/water (4:1 by volume) followed by cold CH$_3$CN, and dried to yield 1.85 g white solid. $^1$H NMR (CDCl$_3$): δ 8.16 (d, 2H, dibenzothiophene-H), 7.48 (t, 2H, dibenzothiophene-H), 7.25 (d, 4H, aryl-H), 7.14 (d, 2H, dibenzothiophene-H), 6.74 (d, 4H, aryl-H), 5.80 (s, 2H, CH), 4.69 (s, 4H, OH), 1.37 (s, 36H, t-Bu), 1.11 (s, 36H, t-Bu).

Example 2

Synthesis of P5102

A mixture of 1 g (4.84 mmol) of 4-t-butyl-2,6-diformylphenol and 25 g (120 mmol) of 2,4-di-t-butylphenol was heated at 96° C. under nitrogen. After stirring for 1 hr, 1.5 mL of 12N HCl solution was added and the mixture was stirred for 12 hr. The red homogeneous solution was allowed to cool to room temperature, and 40 mL of CH$_3$CN and 10 mL of water was added. After stirring at room temperature overnight, the mixture was filtered to remove the by-product (grey solid). Removing CH$_3$CN and water under vacuum from the filtrate gave a sticky reddish brown liquid, which was subsequently transferred into a sublimator to remove 2,4-di-t-butylphenol by sublimation. The residue was stirred in 40 mL of CH$_3$CN and 10 mL of water overnight. The product was collected, recrystallized twice from CH$_3$CN/water (4:1), washed with CH$_3$CN/water (4:1) followed by cold CH$_3$CN, and dried to yield 1.0 g grey solid. $^1$H NMR (CDCl$_3$): δ 7.27 (d, 4H, aryl-H), 6.94 (s, 2H, aryl-H), 6.76 (d, 4H, aryl-H), 5.83 (s, 2H, CH), 5.29 (s, 1H, OH), 4.88 (s, 4H, OH), 1.38 (s, 36H, t-Bu), 1.18 (s, 36H, t-Bu), 1.06 (s, 9H, t-Bu).

Example 3

Polymerization of Ethylene Oxide

A stainless-steel reactor (approximate total volume=15 mL) equipped with a removable polymeric impeller and a glass liner was charged with 0.502 mL of a 0.020 mol/L solution of P4302 in toluene, 0.200 mL of a 0.10 mol/L solution of TiBA in hexanes, and 2.66 mL of hexanes at a stirring rate of 60 rpm. This mixture was sealed, heated to 60° C. and stirred for approximately 86 min. This is the incubation phase. Then, while the reactor was allowed to cool to 40° C., 0.141 mL of a 0.071 mol/L solution of TEA in hexanes was injected into the reactor. A pressure of 100 psi nitrogen was applied to the reactor, and the stirring rate was increased to 800 rpm. Finally, 1.0 mL liquid EO was injected into the reactor. After 143 min of contact with EO at 40° C., the pressure was gradually reduced and the EO finally purged by repeated pressurizations and depressurizations using nitrogen. The glass reactor liner plus the impeller were removed from the reactor and dried under heat and vacuum. The net weight of the residue was 0.808 g. After accounting for catalyst residue, catalyst productivity was calculated to be 36.7 g(polymer)/mmol(Al). The weight-average molecular weight was found to be 150.1 kg/mol and $M_w/M_n$=3.7.

Example 4

Example 3 was repeated except that incubation of P4302 with TiBA at 60° C. lasted ca. 79 min and the reaction with EO lasted 138 min. The yield of this reaction was 0.746 g and catalyst productivity, after subtracting catalyst residue, was 36.7 g/mmol(Al). The weight-average molecular weight was found to be 155.5 kg/mol and $M_w/M_n$=3.3.

Examples 5-18, C1-C12

The results of polymerizations of ethylene oxide using various ligands and catalyst concentrations but following the same reaction procedure as in Example 3 are listed in Table 1. Ligands P4302 and P5102 were dissolved in toluene. Ligands P2102, P4102, and P2202 were dissolved in hexanes. TiBA and DEAC solutions were made up by diluting the solutions received from Sigma Aldrich with hexanes. The total solution volume (excluding EO) was kept at 3.5 mL by the addition of the appropriate amount of anhydrous hexanes prior to the addition of either TiBA or DEAC. The approximate incubation time varied from 60-110 min.

TABLE 1

| Example | Ligand A) | μmol Ligand A) | aluminum compound B) | μmol aluminum compound B) | Lewis base C) | μmol Lewis base C) | EO contact time, min | yield, g | Productivity, g/mmol(Al) | $M_w$ kg/mol | $M_w/M_n$ |
|---|---|---|---|---|---|---|---|---|---|---|---|
| 3 | P4302 | 10 | TiBA | 20 | TEA | 10 | 143 | 0.808 | 39.8 | 150.1 | 3.7 |
| 4 | P4302 | 10 | TiBA | 20 | TEA | 10 | 138 | 0.746 | 36.7 | 155.5 | 3.3 |
| 5 | P4302 | 5 | TiBA | 10 | TEA | 5 | 147 | 0.627 | 62.1 | 236.9 | 3.2 |
| 6 | P4302 | 5 | TiBA | 10 | TEA | 5 | 145 | 0.613 | 60.7 | 274.8 | 2.6 |
| 7 | P4302 | 2.5 | TiBA | 5 | TEA | 2.5 | 147 | 0.273 | 53.9 | 191.8 | 2.2 |
| 8 | P4302 | 2.5 | TiBA | 5 | TEA | 2.5 | 146 | 0.270 | 53.4 | 192.5 | 2.9 |
| 9 | P4302 | 10 | DEAC | 20 | TEA | 10 | 142 | 0.827 | 40.7 | 82.7 | 2.6 |
| 10 | P4302 | 10 | DEAC | 20 | TEA | 10 | 139 | 0.870 | 42.9 | 72.2 | 2.3 |
| 11 | P5102 | 10 | TiBA | 20 | TEA | 10 | 150 | 0.514 | 25.1 | 58.4 | 1.8 |
| 12 | P5102 | 10 | TiBA | 20 | TEA | 10 | 148 | 0.558 | 27.3 | 73.1 | 1.8 |
| 13 | P5102 | 10 | DEAC | 20 | TEA | 10 | 150 | 0.533 | 26.0 | 25.2 | 1.8 |
| 14 | P5102 | 10 | DEAC | 20 | TEA | 10 | 149 | 0.466 | 22.7 | 22.1 | 1.7 |
| 15 | P4102 | 10 | TiBA | 20 | TEA | 10 | 147 | 0.667 | 32.7 | 156.8 | 2.5 |
| 16 | P4102 | 10 | TiBA | 20 | TEA | 10 | 134 | 0.660 | 32.4 | 118.9 | 3.3 |
| 17 | P4102 | 10 | DEAC | 20 | TEA | 10 | 146 | 0.307 | 14.7 | 19.0 | 1.6 |
| 18 | P4102 | 10 | DEAC | 20 | TEA | 10 | 134 | 0.448 | 21.8 | 24.3 | 1.6 |
| C1 | P2202 | 20 | TiBA | 20 | TEA | 10 | 156 | 0.354 | 17.2 | 32.6 | 1.6 |
| C2 | P2202 | 20 | TiBA | 20 | TEA | 10 | 136 | 0.392 | 19.1 | 33.9 | 1.6 |
| C3 | P2202 | 10 | TiBA | 10 | TEA | 5 | 151 | 0.108 | 10.3 | 18.9 | 1.5 |
| C4 | P2202 | 10 | TiBA | 10 | TEA | 5 | 141 | 0.035 | 3.0 | — | — |
| C5 | P2202 | 5 | TiBA | 5 | TEA | 2.5 | 151 | 0.004 | 0.2 | — | — |
| C6 | P2202 | 5 | TiBA | 5 | TEA | 2.5 | 142 | 0.004 | 0.2 | — | — |
| C7 | P2202 | 20 | DEAC | 20 | TEA | 10 | 156 | 0.017 | 0.3 | — | — |
| C8 | P2202 | 20 | DEAC | 20 | TEA | 10 | 126 | 0.021 | 0.5 | — | — |
| C9 | P2102 | 20 | TiBA | 20 | TEA | 10 | 153 | 0.090 | 4.0 | 6.4 | 1.6 |
| C10 | P2102 | 20 | TiBA | 20 | TEA | 10 | 129 | 0.142 | 6.6 | 14.9 | 1.5 |
| C11 | P2102 | 20 | DEAC | 20 | TEA | 10 | 152 | 0.029 | 0.9 | — | — |
| C12 | P2102 | 20 | DEAC | 20 | TEA | 10 | 130 | 0.032 | 1.1 | — | — |

Examples 3-8, 11-12 and 15-16 and Comparative Examples C1-C6 and C9-C10 illustrate catalysts in which component (B) is a trialkylaluminum compound. Examples 3-6 show results for reactions in which the levels of catalyst are identical to those of Comparative Examples C3-C6. Comparing the productivities exhibited in Examples 3-8, 11-12 and 15-16 with those in Examples C1-C6 and C9-C10 illustrates that catalysts of this invention display both higher productivities and polymer molecular weights than those of comparable catalysts in which the ligands are bisphenols.

Examples 9-10, 13-14, and 17-18 and Comparative Examples C7-C8 and C11-C12 illustrate catalysts in which component (B) is a dialkylaluminum halide. Examples 9-10, 13-14, and 17-18 show that catalysts of this invention are superior in productivity to those of comparable catalysts which are based on bisphenol ligands (see examples C7-C8 and C11-C12).

Example 19

Synthesis of P4301

A mixture of 1.44 g (6 mmol) of 4,6-dibenzothiophenedicarbaldehyde (prepared according to the procedure of Skar, M. L.; Svendsen, J. S. Tetrahedron 1997, 53, 17425-17440) and 20 g (120 mmol) of 2-t-butyl-4-methylphenol was heated at 96° C. under nitrogen. After stirring for 1 hr, 2 mL of 12N HCl solution was added and the mixture was stirred for 18 h. The brown homogeneous solution was allowed to cool to room temperature. 40 mL of ethanol and 10 mL of water was added, and the mixture was stirred at room temperature overnight. Light yellow precipitate was collected, washed with ethanol/water (4:1 by volume) followed by cold ethanol and dried. The crude product was triturated in 60 mL of diethyl ether. The product was collected, washed by diethyl ether and dried to yield 2.3 g white solid (45%). $^1$H NMR (CDCl$_3$): δ 8.15 (d, 2H, dibenzothiophene-H, J=8 Hz), 7.45 (t, 2H, dibenzothiophene-H, J=7.6 Hz), 7.13 (d, 2H, dibenzothiophene-H, J=7.2 Hz), 7.05 (s, 4H, aryl-H), 6.51 (s, 4H, aryl-H), 5.76 (s, 2H, CH), 4.72 (s, 4H, OH), 2.13 (s, 12H, CH$_3$), 1.35 (s, 36H, t-Bu). FW=861.24.

Example 20

Synthesis of 4-methyl-2-(1,1,3,3-tetramethylbutyl)phenol

Preparation was modified from the method of Kitchen, L. J., J. Am. Chem. Soc. 1948, 70, 1290. In a round-bottom flask to which were attached two addition funnels, a mixture of p-cresol (33.12 g, 306 mmol) and 33 mL 2,4,4-trimethyl-1-pentene was purged with nitrogen. The flask was cooled to 0° C., and 162 mL additional olefin (total amount of 2,4,4-trimethyl-1-pentene=1.23 mol, 4.0 eq.) was added dropwise, while a mixture of boron trifluoride etherate (5 mL, 40 mmol) and 30 mL nitrogen-sparged hexanes was added at the same time. The addition of olefin proceeded for 160 min, and subsequently the flask was allowed to warm to room temperature, and then was heated to 45° C. with stirring under nitrogen for 16 h. After cooling back to room temperature, the reaction was quenched by the addition of 121 g of 30% NaOH/H$_2$O and 10 mL hexanes. After separation, the organic fraction was washed with water, and the combined aqueous fractions were washed with hexanes. The combined organic fractions were again washed with water and then distilled. The fraction distilling at 141° C. and 9-10 Torr was saved and analyzed. Yield: 30.56 g waxy white solid (45%). M.P.=42-5° C. $^1$H NMR was in accordance with literature (PCT Int. Appl. WO 2006120178 A1, inventors Olesen, Preben. H.; Hansen, H. C.; Christiansen, L. B.; Nielsen, F. E.; Petersen, A. K., to Novo Nordisk A/S).

Example 21

Synthesis of P4307

To a solution of 5.29 g (24 mmol) of 4-methyl-2-(1,1,3,3-tetramethylbutyl)phenol from Example 20 in 30 mL of dry ether was slowly added at 0° C. 10 mL of 3.0 M ethylmagnesium bromide in diethyl ether. The mixture was allowed to stir at room temperature for 15 min. After that, the ether was removed under vacuum, and 50 mL of dry toluene was added. The resulting clear solution was transferred into a solution of 0.96 g (4 mmol) of 4,6-dibenzothiophenedicarbaldehyde (prepared according to the procedure of Skar, M. L.; Svendsen, J. S. Tetrahedron 1997, 53, 17425-17440) in 20 mL of toluene. After heating at 80° C. for 22 h, the mixture was worked up with 1 N HCl and extracted by diethyl ether. The organic phase was washed by water and brine and the solvent was removed by evaporation. The residue was recrystallized from ethanol/water (4:1) twice. The product was collected, washed with ethanol/water (4:1) followed by cold ethanol, and dried to yield 0.95 g white solid (22%). $^1$H NMR (CDCl$_3$): δ 8.12 (d, 2H, dibenzothiophene-H, J=7.2 Hz), 7.41 (t, 2H, dibenzothiophene-H, J=7.6 Hz), 7.11 (d, 2H, dibenzothiophene-H, J=7.6 Hz), 7.04 (s, 4H, aryl-H), 6.47 (s, 4H, aryl-H), 5.71 (s, 2H, CH), 4.58 (s, 4H, OH), 2.14 (s, 12H, aryl-CH$_3$), 1.83 (m, 8H, CH$_2$), 1.40 (s, 24H, CH$_3$), 0.71 (s, 36H, t-Bu). FW=1085.67.

Example 22

Synthesis of P4308

The procedure is similar to that of Example 21, but used 6.2 g (30 mmol) 2-(1-methylcyclohexyl)-4-methylphenol in place of 4-methyl-2-(1,1,3,3-tetramethylbutyl)phenol, along with 11 mL of 3.0 M ethylmagnesium bromide and 1.2 g (5 mmol) of 4,6-dibenzothiophenedicarbaldehyde (prepared according to the procedure of Skar, M. L.; Svendsen, J. S. Tetrahedron 1997, 53, 17425-17440). The residue was recrystallized from ethanol/water (4:1) three times. The product was collected, washed with ethanol/water (4:1) followed by cold ethanol, and dried to yield 1.0 g pale yellow solid (20%). $^1$H NMR (CDCl$_3$): δ 8.13 (d, 2H, dibenzothiophene-H, J=7.6 Hz), 7.44 (t, 2H, dibenzothiophene-H, J=7.6 Hz), 7.13 (d, 2H, dibenzothiophene-H, J=7.6 Hz), 7.06 (s, 4H, aryl-H), 6.50 (s, 4H, aryl-H), 5.73 (s, 2H, CH), 4.73 (s, 4H, OH), 2.14 (s, 12H, CH$_3$), 2.09 (br, 8H, CHH) 1.64 (br, 8H, CHH), 1.32-1.58 (m, 24H, CH$_2$CH$_2$CH$_2$), 1.26 (s, 12H, CH$_3$).

Example 23

Synthesis of P4310

The procedure is similar to that of Example 21, except that 7.93 g (24 mmol) 2,4-bis(α,α-dimethylbenzyl)phenol was used in place of 4-methyl-2-(1,1,3,3-tetramethylbutyl)phenol, along with 10 mL of 3.0 M ethylmagnesium bromide in ether and 0.96 g (4 mmol) of 4,6-dibenzothiophenedicarbaldehyde (prepared according to the procedure of Skar, M. L.; Svendsen, J. S. Tetrahedron 1997, 53, 17425-17440). After heating at 80° C. for 72 h, the mixture was worked up with 1 N HCl and extracted by ethyl acetate. The organic phase was washed by water and brine and the solvent was removed by evaporation. The residue was recrystallized from ethanol/water (4:1) three times. The product was collected, washed with ethanol/water (4:1) followed by cold ethanol, and dried to yield 2.3 g white solid (38%). $^1$H NMR (CDCl$_3$): δ 7.78 (d, 2H, dibenzothiophene-H, J=7.6 Hz), 6.97-7.17 (m, 46H, C$_6$H$_5$, dibenzothiophene-H, aryl-H), 6.66 (d, 2H, dibenzothiophene-H, J=6.8 Hz), 6.54 (s, 4H, aryl-H), 5.79 (s, 2H, CH), 4.00 (s, 4H, OH), 1.41-1.52 (m, 48H, CH$_3$).

Example 24

Synthesis of
2-methoxy-1,3-benzenedicarboxaldehyde

2-Hydroxy-1,3-benzenedicarboxaldehyde (1.05 g, 7 mmol), dimethyl sulfate (1.06 g, 8.4 mmol), and 55 mL of acetonitrile were charged into a 1-necked flask equipped with a mechanical stirrer. 1.45 g (10.5 mmol) of potassium carbonate was added at room temperature under nitrogen. The mixture was stirred at 75° C. until GC-MS indicated that the reaction was complete. The reaction mixture was cooled to ambient temperature, diluted with diethyl ether, washed with NaCl/H$_2$O, and dried over MgSO$_4$. The ether was evaporated off. The crude product was recrystallized from diethyl ether. Pale yellow solid (0.62 g, 54% yield) was obtained. $^1$H NMR in CDCl$_3$ was consistent with the proposed structure. $^1$H NMR (CDCl$_3$): δ 10.4 (2H), 8.1 (2H), 7.4 (1H), 4.1 (3H).

Example 25

Synthesis of P4642

2-Methoxy-1,3-benzenedicarboxaldehyde obtained from Example 23 (0.29 g, 1.8 mmol) and 2,4-di-t-butylphenol (9.28 g, 45 mmol) were charged into a 50 mL 1-necked flask equipped with a mechanical stirrer. The system was purged with nitrogen. The mixture was heated to 96° C. for 1 hour. Concentrated HCl (0.65 mL) was added and the mixture was stirred overnight under this temperature. The reaction mixture was allowed to cool and was then stirred with ethanol/H$_2$O. A solid precipitated from the mixture. After filtration, the crude product was recrystallized from acetonitrile. White solid (0.94 g, 55% yield) was obtained. HPLC analysis indicated the purity was 97%. $^1$H NMR in CDCl$_3$ was consistent with the proposed structure. $^1$H NMR (CDCl$_3$): δ 7.2 (6H, overlapped with residual of CHCl$_3$ from solvent), 7.1 (1H), 7.0 (2H), 6.8 (4H), 5.9 (2H), 5.0 (4H), 3.4 (3H), 1.4 (36H), 1.2 (36H).

Example 26

Polymerization of Ethylene Oxide

The reactor described in Example 3 was charged with 0.257 mL of a 0.0097 mol/L solution of P4302 in toluene, 0.116 mL of a 0.043 mol/L solution of DMAiP in hexanes, and 3.02 mL of hexanes at a stirring rate of 60 rpm. This mixture was sealed, heated to 60° C. and stirred for approximately 80 min. Then, while the reactor was allowed to cool to 40° C., 0.105 mL of a 0.0238 mol/L solution of TEA in hexanes was injected into the reactor. A pressure of 100 psi nitrogen was applied to the reactor, and the stirring rate was increased to 800 rpm. Finally, 1.0 mL liquid EO was injected into the reactor. After 191 min of contact with EO at 40° C., the pressure was gradually reduced and the EO finally purged by repeated pressurizations and depressurizations using nitrogen. The glass reactor liner plus the impeller were removed from the reactor and dried under heat and vacuum. The net weight of the residue was 0.5703 g. After accounting for catalyst residue, catalyst productivity was calculated to be 113.5 g(polymer)/mmol(Al).

Examples 27-31

The results of polymerizations of EO using various ligands, aluminum compounds, and catalyst concentrations but following the same reaction procedure as in Example 3 are listed in Table 2. All ligands were dissolved in toluene. TiBA solutions were made up by diluting the solutions received from Sigma Aldrich with hexanes. DMAiP was dissolved in hexanes. The total solution volume (excluding EO) was kept at 3.5 mL by the addition of the appropriate amount of anhydrous hexanes prior to the addition of the reactants. The approximate incubation time varied from 60-110 min.

Example 32

Polymerization in the Presence of an Alcohol

The reaction described in Example 26 was reproduced except prior to the addition of EO, 0.101 mL of a 0.149 mol/L solution of isopropanol in hexanes was added; also the amount of additional hexane charged to the reactor was 2.92 mL. The molar ratio of alcohol to aluminum atoms was 4.8:1. The yield of this reaction was 0.5278 g and catalyst productivity, after subtracting catalyst and alcohol residues, was 104.7 g/mmol(Al). The weight-average molecular weight was found to be 26.5 kg/mol and $M_w/M_n$=1.8.

Example 33

The reaction described in Example 32 was reproduced except that the EO contact time was 162 min. The yield of this reaction was 0.5305 g and catalyst productivity, after subtracting catalyst and alcohol residues, was 105.2 g/mmol(Al). The weight-average molecular weight was found to be 31.5 kg/mol and $M_w/M_n$=1.4.

Example 34

Polymerization of Ethylene Oxide

A reaction product of ligand and aluminum reagent was prepared by mixing 51 mg P4308, 0.100 mL of a 1 mol/L solution of TiBA in hexanes, and 10 mL of toluene overnight under nitrogen at room temperature. This solution had an aluminum concentration of 0.010 mol/L. The reactor described in Example 3 was charged with 0.2 mL of this solution and 0.186 mL of a 0.0107 mol/L solution of triethylamine in hexanes, as well as 3.11 mL of hexanes. The reactor was sealed and a pressure of 100 psi nitrogen was applied to the reactor, and the stirring rate was increased to 800 rpm. EO (1 mL liquid) was injected into the reactor. After 230 min of contact with EO at 40° C., the pressure was gradually reduced and the EO finally purged by repeated pressurizations and depressurizations using nitrogen. The glass reactor liner plus the impeller were removed from the reactor and dried under heat and vacuum. The net weight of the residue was 0.4746 g. After accounting for catalyst residue, catalyst productivity was calculated to be 236.7 g(polymer)/mmol(Al). The weight-average molecular weight was found to be 345.0 kg/mol and $M_w/M_n$=2.0.

TABLE 2

| Example | Ligand A) | μmol Ligand A) | aluminum compound B) | μmol aluminum compound B) | Lewis base C) | μmol Lewis base C) | EO contact time, min | yield, g | Productivity, g/mmol(Al) | $M_w$ kg/m | $M_w/M_n$ |
|---------|-----------|----------------|----------------------|----------------------------|---------------|---------------------|----------------------|----------|--------------------------|------------|-----------|
| 26 | P4302 | 2.50 | DMAiP | 5.0 | TEA | 2.5 | 191 | 0.5703 | 113.5 | 175.0 | 2.1 |
| 27 | P4302 | 2.50 | DMAiP | 5.0 | TEA | 2.5 | 162 | 0.5800 | 115.4 | 184.0 | 2.2 |
| 28 | P4307 | 2.50 | TiBA | 5.0 | TEA | 2.5 | 183 | 0.6603 | 131.4 | 349.0 | 2.1 |
| 29 | P4307 | 2.50 | TiBA | 5.0 | TEA | 2.5 | 161 | 0.6048 | 120.3 | 361.0 | 2.2 |
| 30 | P4642 | 2.50 | TiBA | 5.0 | TEA | 2.5 | 164 | 0.7419 | 147.8 | 352.0 | 2.9 |
| 31 | P4642 | 2.50 | TiBA | 5.0 | TEA | 2.5 | 159 | 0.7131 | 142.0 | 422.0 | 2.9 |

Examples 35-37

The results of polymerizations of EO using various ligands, aluminum compounds, and catalyst concentrations but following the same reaction procedure as in Example 34 are listed in Table 3. In each case, the ligand and aluminum compound were mixed overnight in toluene prior to injection into the polymerization reactor. There was no incubation phase prior to the introduction of EO. The total solution volume (excluding EO) was kept at 3.5 mL by the addition of the appropriate amount of anhydrous hexanes prior to the addition of the reactants

TABLE 3

| Example | Ligand A) | μmol Ligand A) | aluminum compound B) | μmol aluminum compound B) | Lewis base C) | μmol Lewis base C) | EO contact time, min | yield, g | Productivity, g/mmol(Al) | $M_w$ kg/m | $M_w/M_n$ |
|---|---|---|---|---|---|---|---|---|---|---|---|
| 34 | P4308 | 1.00 | TiBA | 2.0 | TEA | 1.0 | 230 | 0.4746 | 236.7 | 345.0 | 2.0 |
| 35 | P4308 | 1.00 | TiBA | 2.0 | TEA | 1.0 | 217 | 0.4038 | 201.3 | 317.0 | 2.0 |
| 36 | P4310 | 1.00 | TiBA | 2.0 | TEA | 1.0 | 227 | 0.6950 | 346.6 | 515.0 | 2.3 |
| 37 | P4310 | 1.00 | TiBA | 2.0 | TEA | 1.0 | 219 | 0.6817 | 339.9 | 500.0 | 2.5 |

Example 38

Polymerization of Propylene Oxide

The reactor described in Example 3 was charged with 0.238 mL of a 0.0105 mol/L solution of P4302 in toluene, 0.050 mL of a 0.10 mol/L solution of DMAiP in hexanes, and 3.16 mL of hexanes at a stirring rate of 60 rpm. This mixture was sealed, heated to 60° C. and stirred for approximately 80 min. Then, while the reactor was allowed to cool to 40° C., 0.053 mL of a 0.0475 mol/L solution of TEA in hexanes was injected into the reactor. A pressure of 100 psi nitrogen was applied to the reactor, and the stirring rate was increased to 800 rpm. Finally, 1.0 mL liquid propylene oxide was injected into the reactor. After 162 min of contact with PO at 40° C., the pressure was gradually reduced and the PO finally purged by repeated pressurizations and depressurizations using nitrogen. The glass reactor liner plus the impeller were removed from the reactor and dried under heat and vacuum. The net weight of the residue was 0.6456 g. After accounting for catalyst residue, catalyst productivity was calculated to be 128.5 g(polymer)/mmol(Al). The weight-average molecular weight was found to be 217.0 kg/mol and $M_w/M_n=2.6$.

Example 39

The reaction described in Example 39 was reproduced except that the propylene oxide contact time was 153 min. The yield of this reaction was 0.6093 g and catalyst productivity, after subtracting catalyst and alcohol residues, was 121.9 g/mmol(Al). The weight-average molecular weight was found to be 205.0 kg/mol and $M_w/M_n=2.8$.

What is claimed is:

1. A polymerization catalyst comprising the reaction product of
   A.) a ligand of the formula I,

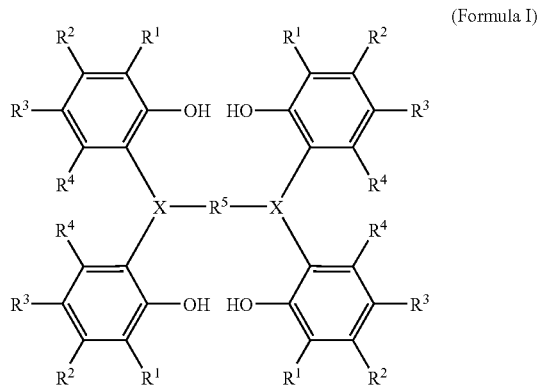

(Formula I)

wherein
   $R^1, R^2, R^3$, and $R^4$ in each occurrence independently are the same or different hydrocarbyl substituents of 1 to 20 carbon atoms, hydrogen, halogen, or alkoxy groups of 1 to 8 carbon atoms;
   X in each occurrence independently is $CR^6$ with $R^6$ being hydrogen or an alkyl group of 1 to 8 carbon atoms; and
   $R^5$ is an organic divalent group of 4 to 40 carbon atoms and optionally substituted with the proviso that the two nodes X are not bound to the same atom or to vicinal atoms in the group $R^5$; and
   B.) an aluminum compound of the formula $AlR^7R^8R^9$, wherein $R^7, R^8$ and $R^9$ each independently is a $C_1$ to $C_{12}$ hydrocarbyl group, hydrogen, halogen, or an alkoxy group of 1 to 20 carbon atoms; and
   C.) a Lewis base selected from the group consisting of amines, phosphines, amides, nitriles, isonitriles, and alcohols.

2. The polymerization catalyst of claim 1 wherein the divalent group $R^5$ is aromatic.

3. The polymerization catalyst of claim 1 wherein the divalent group $R^5$ comprises a heteroatom selected from the group consisting of O, N, S, Se and P.

4. The polymerization catalyst of claim 1 wherein $R^1$ is t-butyl, 1,1,3,3-tetramethylbutyl, 1-methylcyclohexyl, 1-adamantyl, or α, α-dimethylbenzyl.

5. The polymerization catalyst of claim 1 wherein the ligand A) has the formula II

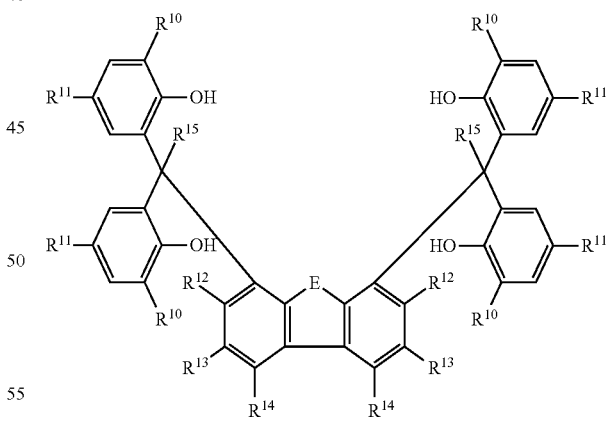

wherein
$R^{10}, R^{11}, R^{12}, R^{13}$, and $R^{14}$ in each occurrence independently are the same or different hydrocarbyl substituents of 1 to 20 carbon atoms or hydrogen,
$R^{15}$ in each occurrence independently is an alkyl group of 1 to 8 carbon atoms or hydrogen, and
E is selected from the group consisting of O, S, $NR^{16}$, $PR^{16}$ and $C(R^{16})_2$, wherein $R^{16}$ in each occurrence independently is a hydrocarbyl substituent of 1 to 8 carbon atoms or hydrogen.

6. The polymerization catalyst of claim 5 wherein $R^{12}$, $R^{13}$, $R^{14}$, and $R^{15}$ are hydrogen and E is sulfur.

7. The polymerization catalyst of claim 1 wherein the ligand A) has the formula III

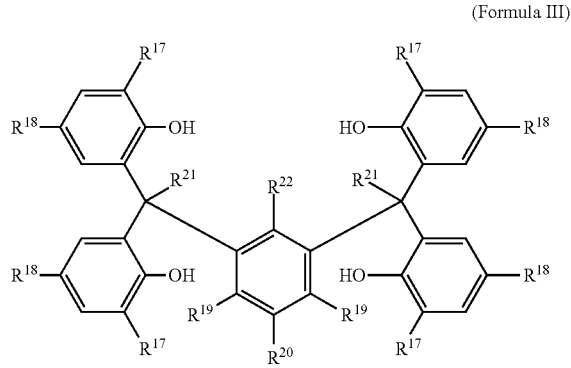

(Formula III)

wherein
- $R^{17}$, $R^{18}$ and $R^{19}$ in each occurrence independently are the same or different hydrocarbyl substituents of 1 to 20 carbon atoms or hydrogen,
- $R^{20}$ is a hydrocarbyl substituent of 1 to 20 carbon atoms, hydrogen or an alkoxy group of 1 to 20 carbon atoms,
- $R^{21}$ in each occurrence independently is an alkyl group of 1 to 8 carbon atoms or hydrogen, and
- $R^{22}$ is hydrogen or a group $OR^{23}$, $SR^{23}$, $N(R^{23})_2$, or $P(R^{23})_2$, wherein $R^{23}$ in each occurrence independently is hydrogen or a hydrocarbyl group of 1 to 8 carbon atoms.

8. The polymerization catalyst of claim 7 wherein $R^{19}$ in each occurrence independently is hydrogen, $R^{20}$ is hydrogen, methyl, t-butyl, or methoxy, $R^{21}$ and $R^{23}$ in each occurrence independently are the same or different and are hydrogen or methyl and $R^{22}$ is a hydroxyl or methoxy group.

9. The polymerization catalyst of claim 1 wherein the molar ratio of the aluminum atoms from the aluminum compound (B) to the OH groups from the ligand (A) is from 0.25:1 to 1:1.

10. The polymerization catalyst of claim 1 wherein the molar ratio of the aluminum from the aluminum compound (B) to the Lewis base (C) is from 5:1 to 1.25:1.

11. A process for homopolymerization or copolymerization of an alkylene oxide comprising the step of contacting one or more alkylene oxides with a catalytic amount of a reaction product of at least:

A.) a ligand of the formula I,

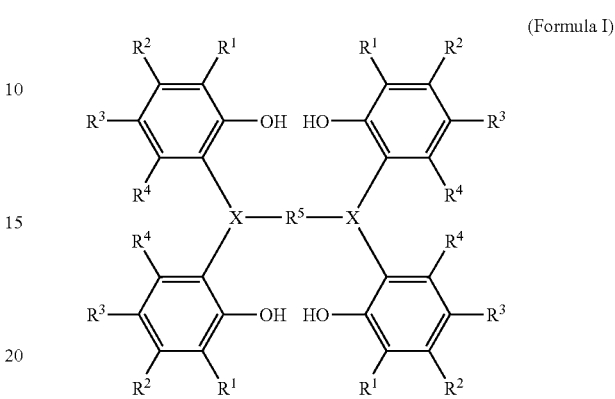

(Formula I)

wherein
- $R^1$, $R^2$, $R^3$, and $R^4$ in each occurrence independently are the same or different hydrocarbyl substituents of 1 to 20 carbon atoms, hydrogen, halogen, or alkoxy groups of 1 to 8 carbon atoms;
- X in each occurrence independently is $CR^6$ with $R^6$ being hydrogen or an alkyl group of 1 to 8 carbon atoms; and
- $R^5$ is an organic divalent group of 4 to 40 carbon atoms with the proviso that the two nodes X are not bound to the same atom or to vicinal atoms in the group $R^5$; and B.) an aluminum compound of the formula $AlR^7R^8R^9$, wherein $R^7$, $R^8$ and $R^9$ each independently is a $C_1$ to $C_{12}$ hydrocarbyl group, hydrogen, halogen, or an alkoxy group of 1 to 20 carbon atoms; and C.) a Lewis base selected from the group consisting of amines, phosphines, amides, nitriles, isonitriles, and alcohols.

12. The process of claim 11 wherein the polymerization is conducted in an aliphatic hydrocarbon medium.

13. The process of claim 11 wherein the alkylene oxide is ethylene oxide.

14. The process of claim 11 wherein the alkylene oxide is propylene oxide.

* * * * *